United States Patent
Dudacek et al.

(12)
(10) Patent No.: US 6,410,075 B1
(45) Date of Patent: *Jun. 25, 2002

(54) STARCH PRODUCTS HAVING HOT OR COLD WATER DISPERSIBILITY AND HOT OR COLD SWELLING VISCOSITY

(75) Inventors: Wayne Dudacek, LaGrange; Joyce A. Engels, Lemont; J. E. Todd Giesfeldt, La Grange; Gregory Vital, Sauk Village, all of IL (US)

(73) Assignee: Corn Products International, Inc., Bedford Park, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,730

(22) Filed: Apr. 15, 1998

Related U.S. Application Data

(62) Division of application No. 08/542,610, filed on Oct. 13, 1995, now Pat. No. 6,001,408.

(51) Int. Cl.[7] .............................. A23L 1/05; C08B 30/12
(52) U.S. Cl. ......................... 426/578; 426/661; 127/32; 127/33
(58) Field of Search ............................... 426/573, 578, 426/661; 127/32, 33

(56) References Cited

U.S. PATENT DOCUMENTS

| | | | |
|---|---|---|---|
| 2,669,523 A | | 2/1954 | Kerr |
| 3,256,115 A | | 6/1966 | Stearns et al. |
| 3,294,681 A | | 12/1966 | Stearns et al. |
| 3,443,990 A | | 5/1969 | Decnop |
| 3,464,857 A | | 9/1969 | Marotta et al. |
| 3,508,964 A | | 4/1970 | Roemer et al. |
| 3,528,853 A | | 9/1970 | Pelton |
| 3,537,893 A | | 11/1970 | Hauser et al. |
| 3,582,350 A | | 6/1971 | Werbin et al. |
| 3,622,677 A | | 11/1971 | Short |
| 3,652,299 A | * | 3/1972 | Penton |
| 3,917,875 A | | 11/1975 | Gardiner |
| 3,962,416 A | | 6/1976 | Katzen |
| 4,025,657 A | | 5/1977 | Cheng et al. |
| 4,044,165 A | | 8/1977 | Baumann |
| 4,072,535 A | | 2/1978 | Short |
| 4,081,567 A | | 3/1978 | Haber |
| 4,105,461 A | | 8/1978 | Racciato |
| 4,119,564 A | | 10/1978 | Van Dam |
| 4,120,986 A | | 10/1978 | Lynn |
| 4,140,566 A | | 2/1979 | Burton et al. ................ 156/428 |
| 4,140,808 A | | 2/1979 | Jonson |
| 4,192,900 A | | 3/1980 | Cheng |
| 4,260,642 A | | 4/1981 | Mitchell et al. |
| 4,298,729 A | * | 11/1981 | Cheng et al. ................. 536/102 |
| 4,418,090 A | * | 11/1983 | Bohrmann et al. ......... 426/578 |
| 4,424,237 A | * | 1/1984 | Wittman, III |
| 4,491,483 A | | 1/1985 | Dudacek et al. |
| 4,495,214 A | | 1/1985 | Seltzer et al. |
| 4,497,840 A | * | 2/1985 | Gould et al. ................. 426/560 |
| 4,508,576 A | * | 4/1985 | Mudde ........................ 106/213 |
| 4,568,550 A | | 2/1986 | Fulger et al. |
| 4,859,484 A | | 8/1989 | Bielskis et al. |
| 4,869,916 A | * | 9/1989 | Clark et al. .................. 426/573 |
| 5,188,674 A | * | 2/1993 | Kasica et al. ................. 127/65 |
| 5,206,046 A | * | 4/1993 | Seeds |
| 5,208,061 A | | 5/1993 | de Coninck et al. |
| 5,275,774 A | | 1/1994 | Bahr et al. |

(List continued on next page.)

FOREIGN PATENT DOCUMENTS

| | | |
|---|---|---|
| WO | WO 96/03891 | 2/1996 |
| WO | WO 96/03892 | 2/1996 |

OTHER PUBLICATIONS

Tressler et al, Food Products Formulary, vol. 2, pp. 156–164, 1975.*

Inglett et al, Food Products Formulary, vol. 4, pp. 58–64, 1982.*

Shaw S. Wang, "Gelatinazation and Melting of Starch and Tribochemisty in Extrusion", Starch/Starke 45 (1993) Nr. 11, pp. 388–390.

E.M. Osman, Starch; Chemistry & Technology, vol. II, Chapter VIII, pp. 189–191; Whistler & Paschall Eds., Academic Press, N.Y. (1967).

Physiochemical Changes in Cornstarch as a Function of Extrusion Variables, J. Owusu–Ansah, F.R. van de Voort and D.W. Stanley, Dept. of Food Science, University of Guelph, Ontario, Canada NIG 2WI, vol. 60, No. 4 1983.

Effect of Extrusion Variables on Product Moisture and Extrusion Crystallinity of Corn Starch, J. Owusu–Ansah, F.R. van de Voort and D.W. Stanley, Dept. of Food Science, University of Guelph, Ontario Canada NIG 2WI. Canadian Institute Food Science Technology, vol. 15, No. 4, pp. 257–261, 1982.

(List continued on next page.)

Primary Examiner—Nina Bhat
(74) Attorney, Agent, or Firm—Norris, McLaughlin & Marcus

(57) ABSTRACT

Physically modified starch products are prepared using pressure and heat such as by extruding starting material starch which optionally can be admixed with gums and/or surfactants. The properties of the products can be adjusted by varying the moisture content of the materials in the extruder and the temperature and pressure at a die plate provided at the discharge end of the extruder. The screw elements in the extruder are selected with the goal of using enough mixing elements at the discharge end to keep the pressure in the extruder barrel as high as possible over a short distance. The physically modified starch products are made up of partially to fully cooked starch and some raw starch particles. They are highly dispersible in cold or hot water with hot or cold swelling viscosity.

9 Claims, 9 Drawing Sheets

U.S. PATENT DOCUMENTS

| | | | |
|---|---|---|---|
| 5,296,247 A | | 3/1994 | Huang et al. |
| 5,342,634 A | | 8/1994 | Murata et al. |
| 5,424,088 A | * | 6/1995 | Christianson et al. ....... 426/578 |
| 5,538,749 A | * | 7/1996 | Shimp ......................... 426/589 |
| 5,547,513 A | | 8/1996 | Mallee et al. |
| 5,584,937 A | | 12/1996 | Finocchiaro ................. 127/426 |
| 5,614,243 A | * | 3/1997 | Dunn et al. .................. 426/578 |

OTHER PUBLICATIONS

Textural and Microstructural Changes in Corn Starch as a Function of Extrusion and Variables, J. Owusu–Ansah, F.R. van de Voort and D.W. Stanley, Dept. of Food Science, Universtiy of Guelph, Ontario Canada NIG 2WI. Canadian Institute Food Science Technology, vol. 17, pp. 65–70, 1984.

Chemistry and Industry of Starch, Second Ed., pp. 56–57 and 536–537; R. W. Kerr Ed., Academic Press, NY (1950).

Starch: Chemistry and Technology, Second Ed., pp. 452–455; R.L. Whistler, J.N. Bemiller, E.F. Paschall Eds., Academic Press, NY (1984).

Principles of Cereal Science and Technology, R.C. Hoseney, Dept. of Grain Science and Industry, Kansas State Univ., Kansas; Table of Chapter Contents and pp. 37–38, 76–77, 145–146, 287–288; (1986).

Corn: Culture, Processing, Products, Major Feed and Food Crops in Agriculture and Food Series, G.E. Inglett Ed., pp. 262–263. 265, AVI Publ. Co., Inc. CT (1970).

Dictionary of Food Ingredients, R.S. Igoe, pp. 36–37, 58–59, 62–63, 130–131, 144–145, 158–165; 1983.

Corn: Chemistry and Technology, S.A. Watson, P.E. Ramstad Eds., pp. 354–357, 377–387, Amer. Assoc. of Cereal Chemists, Inc., Minnesota (1987).

* cited by examiner

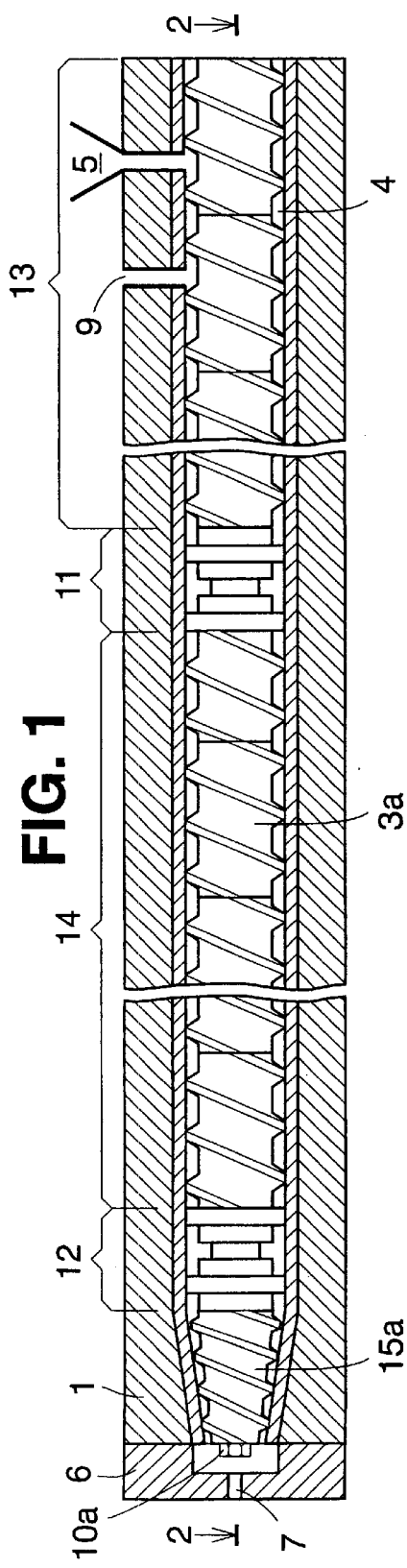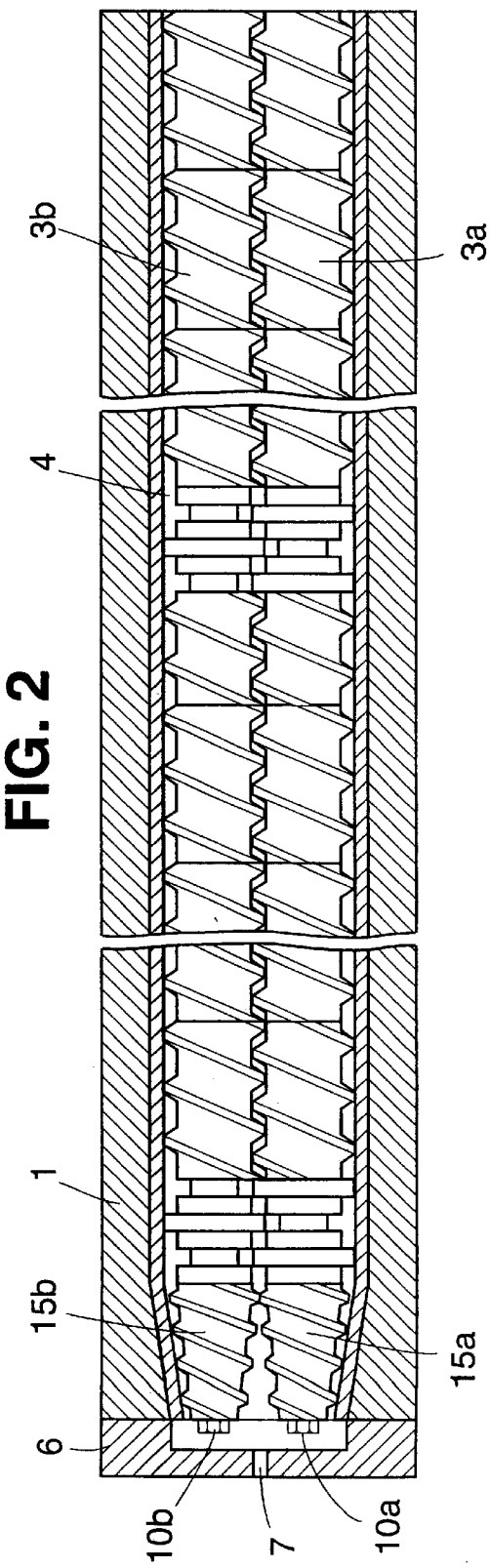

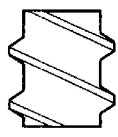
FIG. 3
FIG. 7
FIG. 4
FIG. 8
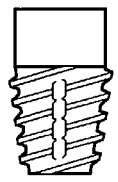
FIG. 12
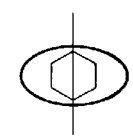
FIG. 5
FIG. 9
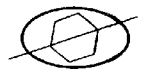
FIG. 13
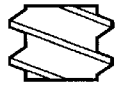
FIG. 6
FIG. 10
FIG. 14
FIG. 15
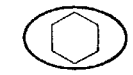
FIG. 11
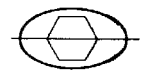

STARCH PRODUCTS HAVING HOT OR COLD WATER DISPERSIBILITY AND HOT OR COLD SWELLING VISCOSITY

CROSS-REFERENCE TO RELATED APPLICATIONS

This is a divisional application of Ser. No. 08/542,610, filed Oct. 13. 1995 now U.S. Pat. No. 6,001,408.

BACKGROUND OF THE INVENTION

1. Field of the Invention

The present invention has to do with dispersible starch products and particularly relates to physically modified starch products prepared using pressure (shear) and heat such as in an extrusion process. The products of the invention have improved functionality in food applications, particularly in instantized hot or cold applications.

2. Description of Related Art

Starches are widely used in food applications as thickeners or bodying agents. They are unique among carbohydrates in occurring as discrete granules. In modern day food processing and storage applications, however, the properties of granular starch must be modified to withstand certain heat, acid and freeze-thaw conditions. Presently, food processors prefer to avoid chemically modified starches and employ natural products such as physically modified starches.

When granular starch is heated in excess water above the gelatinization temperature, it undergoes hydration and gelatinizes, forming a viscous solubilized paste. In practice, starch granules require dispersion in cold water before cooking at the time of use.

Pregelatinized starch products have been developed that provide reconstituted pastes when mixed with hot or cold water. The starch manufacturer hydrates the raw starch and then gelatinizes the starch by such techniques as roll-drying or spray-drying and the like. Unfortunately, the dried pregelatinized starch product does not readily disperse in hot water and agglomerated masses are formed giving lumpy pastes with inconsistent paste viscosities.

Attempts have been made to circumvent the dispersibility problem by inclusion of surfactants with dried pregelatinized starch and somewhat improved dispersibilities were obtained as exemplified in U.S. Pat. Nos. 3,537,893; 3,582,350; 3,443,990 and 4,260,642. The effect of surfactants on starch pastes is also described by E. M. Osman in Starch; Chemistry & Technology, Vol. II, Chapter VII, pp. 189–191; Whistler & Paschall Eds., Academic Press, N.Y. (1967).

The term "heat-moisture treated starch" is known in the art and is commonly used to refer to a starch which has been subjected to a heat treatment under controlled moisture conditions, the conditions being such that the starch undergoes neither gelatinization (i.e., exhibits no substantial loss of birefringence) or dextrinization. If heat-moisture treated starches are used in hot-water dispersible foodstuffs, dispersion of the mix into boiling water nevertheless results in formation of lumps and agglomerated or coated masses by surface gelatinization wherein a coating barrier forms on the starch preventing further hydration.

A hot or boiling water dispersible starch product that consistently provides a uniform paste having no lumps or agglomerated masses associated therewith is described in U.S. Pat. No. 4,491,483.

The combination of starch and gums or starch, gums and emulsifiers is generally known (see U.S. Pat. Nos. 3,917, 875; 4,140,566; 4,081,567; 4,105,461; 4,119,564; 4,120, 986; 4,140,808 and 4,192,900). The gums are used as thickeners or stabilizers in these formulations. Nevertheless, food formulators prefer to use as much starch as possible in these products due to the high cost of gums.

Methods of modifying starch and blends of starch and gums using extrusion are known. U.S. Pat. No. 4,859,484 describes a method of processing starch and gum blends wherein the starch and gum are separately hydrated, intimately commingled and extruded. The method requires water in the amount of 70–200% based on starch weight. Two other U.S. Pat. Nos. 5,208,061 and 5,275,774, describe extrusion methods for making starch products. The use of extrusion to modify starch also has been described by Shaw S. Wang in "Gelatinization and Melting of Starch and Tribochemistry in Extrusion", Starch/Starke 45 (1993) Nr.11, pp 388–390.

Applicants have now discovered an improved method of physically modifying starches and mixtures of starches and other materials using pressure and heat, such as by extrusion under specified conditions of moisture, temperature and pressure. The physically modified products of the improved method can be made for high dispersibility in hot or cold liquids and do not form agglomerated masses.

SUMMARY OF THE INVENTION

Physically modified starch products having improved functionality in food applications are prepared by extruding starch or mixtures of starch and gum, starch and surfactant, or starch, gum and surfactant. An unmodified starch from one farinaceous material or combinations of unmodified starches from different farinaceous materials and/or a modified starch or starches (such as chemically, genetically or physically modified starches) can be employed as the starting material starch. When gum is mixed with the starting material starch, one or a combination of gums can be used. A surfactant which can be one or a combination of surfactants is added to the starting material starch or starch/gum mixture when a modified starch-surfactant product is desired. The term starting materials as it is used herein means starting material starch, or a mixture of starting material starch and gum, or a mixture of starting material starch, gum and surfactant, or a mixture of starting material starch and surfactant.

The properties of the products of the invention are manipulated by controlling the conditions of extrusion such as the moisture content of the material in the extruder and the die plate temperature and pressure of the extruder.

Known equipment for modifying starches other than extruders can be employed to make the products of the invention and such equipment includes spray dryers, roll dryers, compacting rolls, mills, explosion puffers and other means which allow the operator to control the pressure (or shear), temperature and moisture of the starting materials so that the desired product properties can be obtained.

When mixtures of more than one starch, or starting material starch with other components such as gum and/or surfactant, are employed, the mixtures can be prepared partially or completely before they are added to the extruder or they can be prepared by mixing in the extruder itself. The terms mixture, admixture, blend and the like are used interchangeably in this specification.

The products can be used in many applications calling for modified starch, including food applications such as dry gravy/sauce mixes, (i.e. spaghetti sauce, turkey gravy, hollandaise sauce), salad dressings (pourable and spoonable), instantized starch (for home use), pudding mixes, soup and carriers for dough conditioner, (baking). The products of the invention also exhibit desirable viscoelastic properties (characteristics that are related to desired mouthfeel that are associated with fat mimetic materials).

The extruder is operated with the objective of providing controlled mixing of starch granules such that the end product is a heterogeneous mass of gelatinized, partially gelatinized and ungelatinized starch granules as indicated by photomicrographs. The extruder also is operated with the objective of maximizing mechanical energy levels while minimizing thermal energy input. A screw element configuration for the extruder is selected with the goal of using enough mixing elements at the discharge end to keep the pressure in the barrel as high as possible over a short distance. Moisture content of the starting materials is adjusted by adding water prior to introducing the starting materials into the extruder and/or by water injection into a first section of the extruder barrel at or near the inlet for the starting materials. A die, having a variable orifice or a preselected fixed orifice, is used as a means to control the die-plate pressure within a predetermined range. Pressure and temperature at the die-plate also are a function of the screw configuration and rotational screw speed (revolutions per minute), the rate of feed into the extruder and the composition of the material in the extruder. Temperature is also a function of any cooling or heating added by means of a barrel jacket. When the product exits the die orifice(s) of the extruder, water flashes off as steam, thus reducing the moisture content of the extrudate.

A characteristic of the process is that it requires minimal external temperature control of the type provided by heating and/or cooling jackets surrounding the extruder barrel and in some cases sufficient heat is provided by shearing within the extruder barrel so that no external heat is needed. The ingredients preferably are added to the extruder at ambient temperatures although pre-heating or pre-cooling of the starting materials and/or added water can be used as a means of achieving desired temperatures within the extruder.

The products of the invention can be dried and/or ground or milled provided that the conditions of drying, grinding or milling are selected so as to avoid further gelatinization and loss of functionality of the product. Accordingly, it is preferable to dry at temperatures of about 120° F. or less and employ multiple pass grinding or milling to avoid overheating. Conventional dryers such as belt dryers, tube and pneumatic tube dryers, toroidal dryers and flash dryers can be employed. Conventional grinding or milling equipment also can be employed such as a Fitz comminuting machine.

The invention also relates to a unique agglomeration procedure which can be used to enhance the dispersibility of the products in hot systems.

All percentages set forth herein are by weight and all ratios are expressed in terms of weight/weight unless otherwise designated. All references to the weight of starch, starting material starch or starting materials herein include the moisture present therein.

BRIEF DESCRIPTION OF THE DRAWINGS

FIG. 1 is a side view in partial cross-section of an extruder barrel with screws disposed therein.

FIG. 2 is a top view in partial cross-section of an extruder barrel with screws disposed therein.

FIG. 3 is a 9 unit ¾ pitch screw designated as Wenger 55325-003.

FIG. 4 is a 9 unit ¾ pitch cone screw designated as Wenger 55321-005.

FIG. 5 is a 9 unit full pitch screw designated as Wenger 55357-003.

FIG. 6 is a 6 unit full pitch screw designated as Wenger 55357-103.

FIG. 7 is a 9 unit ½ pitch screw designated as Wenger 55326-003.

FIG. 8 is a 6 unit ½ pitch screw designated as Wenger 10 55326-103.

FIG. 9 is a triple flight cone screw designated as Wenger 55387-003.

FIG. 10 is a 4.5 unit ¾ pitch screw designated as Wenger 55395-003.

FIGS. 11, 12 and 13 are thick shearlocks designated as Wenger 55324-101, 55324-103 and 55324-105, respectively.

FIGS. 14 and 15 are thin shearlocks designated as Wenger 55364-101 and 55364-103, respectively.

DETAILED DESCRIPTION OF THE INVENTION

Figure 2A:
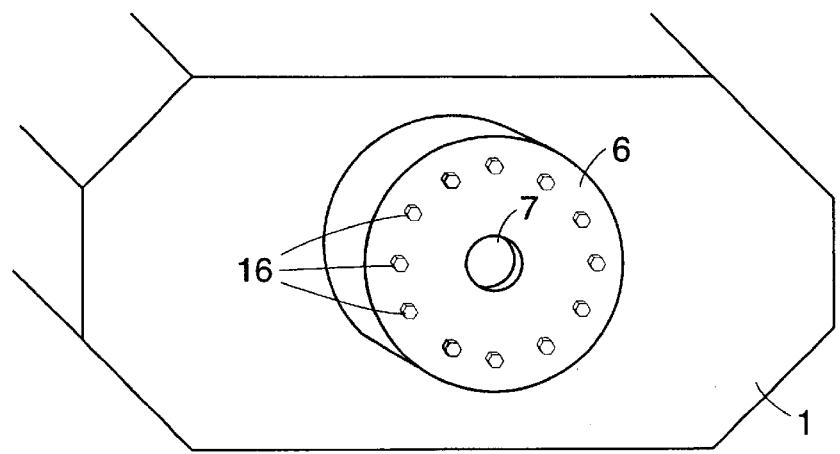
FIG. 2a illustrates a single orifice die.

Starches derived from one or a combination of farinaceous materials can be used as starting material starch according to the invention. Any farinaceous material can be used as the source of the starch including corn, waxy corn, wheat, potato, tapioca, manioc, grain sorghum, sago and rice, among others. Accordingly, the starting material starch can be comprised of one type of unmodified starch, blends of different types of unmodified starch, a modified starch or starches and/or blends of modified and unmodified starches. The starting material starch generally will have a moisture content from about 8% to about 13%.

A gum or a mixture of gums can be employed in combination with the starting material starch and the term gum herein can refer to one gum or a combination of gums. Suitable gums include locust bean gum, xanthan gum, guar gum, gellan gum, prehydrated gum and the like.

When an admixture of starch and gum is employed, the gum is added in an amount from about 0.05% to about 20%, preferably from about 0.05% to about 10% and most preferably from about 0.5 to about 5% based on starting material starch weight.

At the start-up of the process, when the starting materials are first introduced into an extruder, an excess of added water is used as a diluent to facilitate flow through the extruder. Typically, the extruder is started with water and then the starting materials are gradually added. As the rate of addition of starting materials is increased, the rate of water addition is decreased until the desired steady state processing conditions are achieved. The water is admixed with the starting materials at or near the inlet of the extruder. As an option, some excess water also can be added to the starting materials before they are introduced into the extruder.

The desired steady state operation (i.e. a steady state continuous extrusion process) according to the invention is achieved at a total moisture content (i.e. all of the materials being processed in the extruder, namely added water plus the moisture content of the starting materials) of from about 18% to about 45%, preferably from about 18% to about 35%, and most preferably from about 20% to about 30% based on starting material starch weight. The moisture content is controlled within this range in order to manipulate the properties of the end product, with lower moisture processing conditions yielding a product having less gelatinization than higher moisture processing conditions.

When starting material starch and a gum are employed as the starting materials, the moisture content at steady state operation of the extruder also is controlled within the same ranges as described above and the processing parameters and properties of the end products are manipulated in the same manner as described above.

In the embodiment of the invention wherein a surfactant is employed with a starting material starch or both starting material starch and gum to make up the starting materials of the invention, the surfactant can be made up of one or a combination of surfactants and they generally are employed in an amount from about 2% to about 50%, and preferably from about 2% to about 35%, based on the weight of starting material starch. Suitable surfactants include food emulsifiers such as glycerides, preferably a mono- or di-glyceride of fatty acid. Exemplary surfactants include glycerol monostearate, sodium stearoyl-2-lactylate, calcium stearoyl-2-lactylate and other alkali metal salt stearoyl-2-lactylates, palmitic or stearic fatty acids, D-glucose 3-stearate, methyl alpha-D-glucoside-6-stearate, sucrose monostearate, sorbitan tetrastearate, thereof, sodium stearoyl fumarate and the like. The moisture content at steady state and the processing parameters and properties of the end product are manipulated in the same manner as described above.

Various types of extruders can be employed according to the invention provided that they can be operated in a manner whereby pressure and temperature conditions within the extruder and the pressure and temperature at the die plate can be controlled. Single screw or twin screw extruders can be employed but the preferred extruders for most applications are the twin screw type because they have better barrel heat transfer and they can achieve better mixing. Suitable extruders have a barrel and a screw element or two screw elements disposed within the bore thereof. The configuration of the screw elements can be varied to modify the operating properties of the extruder and the properties of the products of the invention.

A die plate is provided at the discharge end of the extruder and the size of the orifice or orifices in the die plate are selected to achieve the desired die plate temperature and pressure. The die plate pressure is adjusted to between about 200 and about 2500 pounds per square inch gauge (abbreviated herein as "psig or p.s.i.g."), preferably from about 500 to about 1600 psig, and the die plate temperature is controlled at from about 140 F to about 285° F., preferably from about 140° F. to about 265° F. It is understood that the die plate temperature may be somewhat lower than the temperature of the extrudate.

A twin screw extruder is illustrated in the drawings wherein FIG. 1 is a side view in partial cross-section of extruder barrel 1 with screw 3a disposed within the bore 4 thereof. The same elements are illustrated in FIG. 2 which is a top view in partial cross-section wherein both screws 3a and 3b are shown. The screws are corotated clockwise by conventional drive means (not shown) so that the starting material starch or starting materials which are introduced into the extruder inlet 5 are moved to the left and forced toward die plate 6 and through orifice 7 thereof.

Figure 2B:
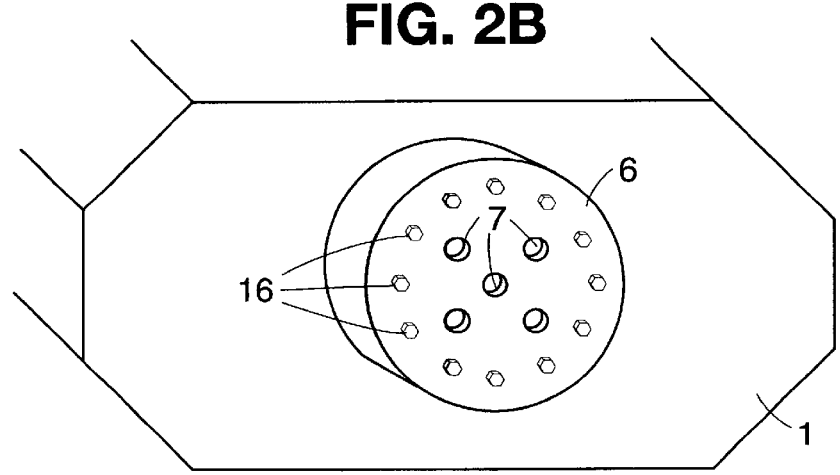
FIG. 2b illustrates a multiple orifice die.
Figure 2C:
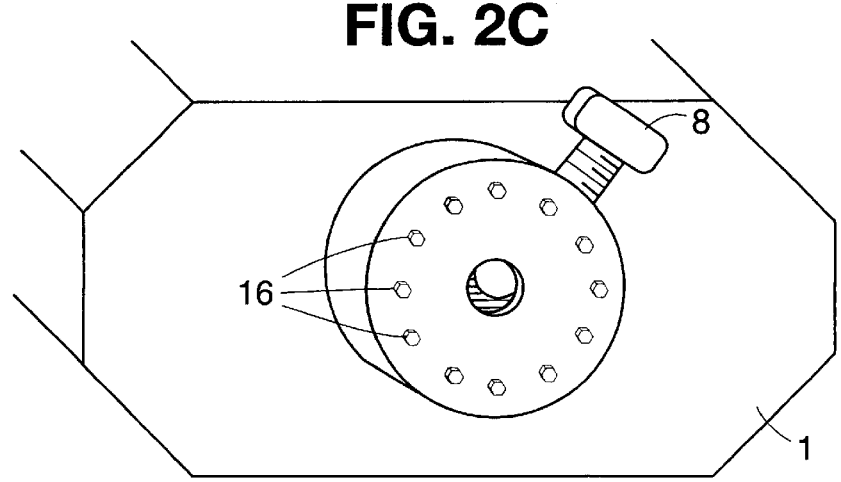
FIG. 2c illustrates an adjustable orifice die.

The die plate 6 can have one orifice 7 or multiple orifices 7 as illustrated in the partial perspective views FIGS. 2a and 2b, respectively. Adjustable orifice die plates also can be used wherein the size of the opening of one or more orifices can be changed, thereby changing the die plate pressure. As the flow rate in the extruder is increased, the size of the orifice is increased to maintain the desired temperature and pressure at the die plate. A single opening adjustable orifice die plate is illustrated in a partial perspective view FIG. 2c wherein adjustment thumb screw 8 is used to change the size of the opening of orifice 7. The mounting bolts 16 disposed near the perimeters of each die plate serve to attach the die plate to the discharge end of the extruder.

Water is introduced into the extruder through inlet 9 and the starting material starch or starting materials are introduced into the extruder through inlet 5. As discussed above, an excess of water is used at the start up of the process followed by a gradual reduction until steady state processing conditions are achieved. At steady state, the moisture content of the material being processed in the extruder is maintained at a relatively constant value, within a desired controlled tolerance, and the die plate temperature and pressure are similarly maintained at relatively constant values.

The screws 3a and 3b are made up of various extruder elements. The extruder elements used to make up the screws which were employed in the working examples of the invention are illustrated in FIGS. 3–15. The screws 3a and 3b shown in FIGS. 1 and 2 illustrate a configuration of screw elements affixed on hexagonal shafts 10a and 10b with mixing elements 11 and 12 made up of various combinations of the shearlock extruder elements shown in FIGS. 11–15 and the conveying elements 13 and 14 are made up of various combinations of the extruder elements shown in FIGS. 3, 5–8 and 10. Cone screws 15a and 15b (see also FIGS. 4 and 9) are provided to increase pressure just before the die plate. As discussed above, the screw elements are configured to make screws having suitable mixing elements at the discharge end to keep the pressure in the barrel as high as possible over a short distance.

The products of the invention can be made for high dispersibility in hot or cold liquids and do not form agglomerated masses. The characteristics of the product are determined by the starting materials and by the processing conditions of moisture content, pressure (shear) at the die plate and temperature at the die plate. The temperature and pressure in the extruder upstream of the die plate may also be controlled to obtain the desired characteristics of the product and such control is achieved by varying the rotational screw speed, varying the rate of feed into the extruder, and cooling and/or heating using jackets. Accordingly, the processing conditions are selected to obtain a product comprised of gelatinized, partially gelatinized and ungelatinized starch granules in a heterogeneous admixture. The relative amounts of gelatinized, partially gelatinized and ungelatinized material will determine the characteristics of the product with respect to dispersibility and viscosity. Products having a higher degree of gelatinized granules are most easily dispersed in liquids and those with less fully cooked particles will provide higher viscosity.

Photomicrographs of the products of the invention show a range of gelatinization from fully cooked through partially gelatinized to raw granules in a heterogeneous mixture. It is hypothesized that this range of gelatinization provides the unique combination of dispersibility and viscosity which characterize these new products.

The thickening power of starch can be predicted analytically by measuring hydration capacity. The following method was adapted from AACC Method 56-20, available from American Association of Cereal Chemists, 3340 Pilot Knob Road, St. Paul, Minn. 55127-2097 U.S.A., by doubling weights and volumes to use a 250 ml. centrifuge tube, and was used to measure hydration capacity of the products of the invention:

1. Determine sample dry substance (d.s.).
2. Record tare weight of centrifuge tube.
3. Add a 4 gram sample "as-is" into the centrifuge tube.
4. Rapidly add 80 ml. of distilled water, cap the tube and shake as quickly as possible to minimize lumps.
5. Let stand 10 minutes, inverting 3 times at 5 minutes and 10 minutes.
6. Centrifuge for 15 minutes at 2000 rpm.
7. Separate the supernatant from the precipitated layer.
8. Weigh centrifuge tube containing precipitate layer.
9. Measure refractive index (RI) of supernatant and determine % d.s. using the RI-DS table for 1132 corn syrup (see CRA method E-54 available from the Corn Refiners Association, 1701 Pennsylvania Avenue, N.W., Suite 950, Washington, D.C. 20006).

The following calculations were made:

$$\text{Hydration Capacity} = \frac{\text{Weight of Sediment}}{\text{Weight of Sample (d.s.basis)}}$$

Percent solubles=% d.s. of supernatant

The products of the invention have a hydration capacity of at least about 5 and preferably at least about 7. The products of the invention also have a percent solubles of less than about 2, preferably less than about 1.5.

EXAMPLES

The work was completed using Wenger TX52 and TX80 extruders from Wenger Mfg., Sabetha, Kans., U.S.A. Most of the work utilized the TX80 twin screw extruder having co-rotating screws, a 100 horsepower motor and a belt drive system. The extruder had a barrel jacket with multiple sections. The last three barrel sections were cooled using city water at 66–67° F. Starch was fed from a 300 lb. stainless hopper though a preconditioning paddle screen into the extruder barrel. Ingredients were mixed in 200 lb. batches with a 1.5 horsepower Day ribbon blender and product was conveyed to the extruder with an AFC 2 horsepower inclined spiral feeder.

The screw elements were configured so as to use enough mixing elements at the discharge end to keep pressure in the barrel as high as possible over a short distance. The configuration uses maximum motor torque, while minimizing thermal energy and heat build-up. Cooling water was manually adjusted to control temperature.

The screw element configurations included six mixing elements (three forward followed by three reverse) starting just behind a cone screw at the discharge end of the extruder. Six forward flow mixing elements also were employed further from the discharge end, i.e. closer to the inlet. All the remaining elements were forward conveying screw elements.

Extrudate samples were ambient air dried and milled on a Fitz Model DS6 comminuting machine. Best results were obtained when starch was milled using two passes. The first pass milling included a number three round hole screen (0.128" diameter). The second pass milling included a 0027 screen (0.027" diameter). Moist extrudate samples collected the last day of the trial were dried in an air oven at 120° F for more than one day.

The degree of starch gelatinization present after extrusion was measured using microscopy during and subsequent to extrusion trials to identify the effect of extrusion conditions on starch granules. Inspections of starch granules for birefringence gave a representation of the degree of gelatinization and number of raw starch granules. Particle size analysis was also used to characterize starch granules swollen beyond the normal 13–15 micron distribution.

Example 1

Conventional unmodified corn starch was extruded alone and coextruded with sodium stearoyl lactylate, 10 D.E. maltodextrin, sucrose, dextrins, waxy starch and gums. These trials employed heat and shear, resulting in a highly soluble starch with limited dispersibility and swollen viscosity.

The trial used BUFFALO 3401 unmodified corn starch from Corn Products, Argo, Ill., U.S.A and AMISOL 4000 waxy maize starch from Refinacoes de Milho, Sao Paulo, Brazil as primary ingredients. Casco 7011 and 7071 dextrins from Casco Inc., Etobicoke, Ontario, Canada as well as Casco's 1910 (10 D.E.) maltodextrin were used as additives.

Locust bean and xanthan gum were obtained from Colony Import and Export Corporation, Garden City, N.Y., U.S.A. Sodium stearoyl lactylate (ARDOTAN SP55K) was purchased from Grinsted Products, Industrial Airport, Kans., U.S.A. Pre-Hydrated gums were obtained from TIC Gums, Belcamp, Md., U.S.A.

Trials were conducted on a Wenger TX52 twin screw corotating extruder. The barrel jacket was configured such that the last three sections were connected to a Mokon hot oil temperature controller. Starch was fed from a 300 lb stainless hopper through a preconditioning paddle screen to the extruder barrel. City water was metered into preconditioner for manual moisture control. Ingredients were mixed in excess of 12 minutes in 100 lb batches with a 0.75 hp paddle mixer.

The experimental screw configuration is described in Table I which refers to the extruder elements illustrated in the drawings. The goal of the configuration was to use enough mixing elements at the discharge end to keep pressure in the barrel as high as possible over a short distance. This configuration uses maximum motor torque, while minimizing thermal energy and heat build up. Cooling was manually adjusted to control temperature.

Die configuration consisted of a single die with a five hole opening. Each hole was 5 mm in diameter.

Most extrudate samples were ambient air dried and manually crushed for transportation. Select extrudate samples were later ground using a Mikro-Samplmill with a 0.027 screen.

Initial runs included extruding only unmodified BUFFALO 3401 corn starch. Subsequent runs included coextruding starch with sodium stearoyl lactylate, 10 D.E. maltodextrin, sucrose, dextrins, waxy starch, locust bean, xanthan, and prehydrated gums. Waxy corn starch was also extruded as a primary ingredient with a similar protocol. Ingredients and conditions were chosen to provide a dispersible extrudate suitable for use in instantized hot beverages and other food applications.

Operating conditions and starting materials for the runs are shown in Table III. Starch feed rate for a majority of the runs was 34.3 kg/hr (8 revolutions per minute (rpm) feeder setting). The minimum stable water addition rate was 3.3 kg/hr. Total moisture of the starch-water mixture entering the extruder barrel at these conditions ranged between 19.3 and 20.2%. Barrel rpm ranged between 160 and 212 depending upon operating conditions.

The Mokon hot oil unit maintained a constant 120° C. temperature on the first two jacket sections (from the die plate) on the barrel. Temperature was held constant during the trial to obtain a fully gelatinized and expanded extrudate.

Die plate pressures typically ranged from 400 to 600 psig. Percent extruder load (i.e. % electrical draw on the motor) ranged from 16 to 46% depending on run conditions. Preconditioner rpm typically ranged from 82 to 105 rpm.

The start-up procedure consisted of using excess water with an initial starch rate. Starch rate was increased to the desired setpoint with excess water. Finally, the water rate was reduced until the desired expansion of extrudate was achieved.

Extrudate samples were inspected after the ingredients had been fed into the preconditioner for no less than 12 minutes.

Unground extrudate varied in color depending upon additive and composition. Most extrudate "ropes" were brittle upon drying and cooling. Extrudate samples were only crushed for transportation. Select samples were ground using an 0027 screen on a Mikro-Samplmill.

Example 2

The trial used Corn Products' BUFFALO 3401 unmodified corn starch. Locust bean and xanthan gum and Pre-Hydrated gums and other materials were obtained from the same sources as in Example 1.

The work was completed on a Wenger TX80 extruder. The Wenger TX80 twin screw extruder has corotating screws, 100 hp motor and a belt drive system. The extruder barrel jacket was configured with cooling and steam heat segments. City water (66° F.) was varied manually for cooling on the last three barrel sections. Starch was fed from a 300 lb stainless hopper through a preconditioning paddle screen into the extruder barrel. City water was metered into the preconditioner for moisture control. Ingredients were mixed in 200 lb batches with a 1.5 hp Day ribbon blender. Product was conveyed to the extruder with an AFC 2 hp inclined spiral feeder.

The screw configuration is described in Table II which refers to the extruder elements illustrated in the drawings and, as with Example 1, it was designed to use enough mixing elements at the discharge end to keep pressure in the barrel as high as possible over a short distance.

Cooling water was manually adjusted to control temperature.

Die configuration consisted of one, single, round-hole, adjustable die with a ¾ inch maximum diameter orifice. The diameter of the die orifice was adjusted to <0.344 inches (0.0929 sq. in.) and >0.281 inches (0.0620 sq. in.) opening. Larger openings would be required for increased production rates.

Extrudate samples were ambient air dried and milled on a Fitz Model DS6 Comminuting Machine. Best results were obtained when starch was milled using two passes. The first pass milling included a #3 round hole screen (0.128 inch dia.). The second pass milling included a 0027 screen (0.027 inch dia.). Moist extrudate samples collected the last day of the trial were dried in an air oven at 120° F. for more than a day.

The trial included extruding unmodified Corn Products' BUFFALO 3401 corn starch. The starch was also coextruded with locust bean, xanthan and Pre-Hydrated gum from TIC gums. Ingredients and conditions were chosen to provide a dispersible extrudate suitable for instantized hot food applications.

Operating conditions and starting materials for the runs are shown in Table IV. Starch feed rate for a majority of the trial was 4.6 lb/minute (17 rpm feeder setting). The minimum stable water addition rate during the trial was 0.408 lb/min. Total moisture of the starch-water mixture entering the extruder barrel for these conditions ranged between 18.7 and 19.6%. The Wenger TX80 extruder barrel typically ran between 152 and 158 rpm.

The first two jacket sections (from the die plate) on the barrel were cooled manually with 67° F. city water.

Die plate pressures typically ranged from 1200 to 1500 psig. Percent extruder load ranged from 38 to 56% based on run conditions. The twin shaft preconditioner rotation was preset to 170 rpm.

The start-up procedure consisted of using excess water with an initial starch rate. Starch rate was increased to the desired setpoint with excess water. Finally, the water rate was reduced until the desired conditions were achieved. Extrudate samples were collected after a minimum of 12 minutes.

Extrudate "ropes" coming directly off the extruder were flexible. Most extrudate samples were moderately brittle upon drying and cooling.

For best hot swollen viscosity results, extrudate samples were milled with two passes on the Fitz DS6 Comminuting Machine. Two passes minimized any additional starch gelatinization due to heat build up in the mill. The first pass was milled with a #3 screen (0.128" dia.). The second pass was milled with an 0027 screen (0.027" dia.).

A control composition was prepared for purposes of comparative testing. The starting material starch was BUFFALO 3401 unmodified corn starch and it was processed in the Wenger TX80 twin screw extruder. Starch was fed at 4.6 lb/minute and water was added initially at about 1.1 lb/minute and during processing was added at rates as low as about 0.2 lb/minute. The extruder was run at 34–40% load capacity and an extruder rpm of 156–158. Temperature in the next to last section of the multiple section extruder was 176° F. Die plate temperature was 245–250° F. and die plate pressure was 1200 psig.

Example 3

Analytical and Application Testing

Light microscopy was used to provide visual confirmation of the degree of gelatinization being achieved. Samples were mounted in an immersion oil having a refractive index of 1.605 and viewed at 100×, 98% crossed polars. The extrudates also were tested for both hot and cold applications.

During the first day of operation, small batches of material reflecting a variety of extrusion conditions were prepared. Extrusion conditions for all runs are listed in Table IV. Photomicrographs of these materials vs. the control composition were evaluated and it was observed that the control extrudate produced contained material ranging from uncooked, raw starch granules through partially gelatinized to fully cooked pieces. Partially polarized images showed raw starch (Maltese crosses), through partially gelatinized (some birefringence) to totally cooked particles (no birefringence) in a heterogeneous mixture.

Material 312-1A (Table IV) was extruded at the lowest temperature of all the prototypes processed the first day, 159° F. A photomicrograph of the material exhibited some individual raw starch particles with the majority of material being partially to fully cooked starch.

Extrudate 312-1H (Table IV) (single-pass milling) was processed at higher temperature (259° F.), lower pressure, and photomicrographs showed large size pieces tending toward a more cooked appearance with many more individual raw starch granules with Maltese crosses. Particles displaying an intermediary degree of cook were not as evident as they were in the 312-1A sample. 312-1H (Table IV) (double-pass milling) showed a greater amount of individual, uncooked, raw starch granules than in the single-pass material.

Extrudate 312-J (Table IV) was processed at the highest temperature evaluated, 266° F. For the majority of fields viewed, small pieces of individual, raw starch were the prevalent birefringent particles. Typically, large pieces were completely cooked.

For the hot applications, 30 g of agglomerated material (extruded starch, maltodextrin, sugar) were mixed into 200 ml hot liquid with continuous stirring. Ease of dispersion and the rate and degree of viscosity formed were observed. Mouthfeel, body, and cooked flavor of the formulation were also noted. For comparison purposes, both a positive control using the control composition and a negative control with batch 3401-6 material (Table III) were formulated.

For the cold applications, 15 g of extruded starch were added to 200 ml of cold liquid with continuous hand stirring. In separate tests, formulations using both cold tap water and cold homogenized whole milk were tested. Rate of hydration, viscosity level achieved, mouthfeel and flavor were noted. As with the hot application testing, a positive control (using Batch 284-1A) and a negative control using batch 3401-6 (Table III) were formulated for comparison testing.

Application test results for the prototype small batch extrudates are summarized as follows:

In the hot application tests starches extruded under less severe conditions (i.e. 312-1A and 312-1B) (Table IV), specifically lower temperatures at the die plate, seemed to thicken more immediately and provide more body. 312-1H (Table IV), both single and double-pass milled, was not as thick as the 312-1A, 1B (Table IV).

In the cold formulations, just the opposite seemed to be the case. In cold water formulations, starches extruded at the higher temperature seemed to thicken more. 312-1H (Table IV) (single and double-pass milled) seemed to thicken more than 312-1A and 312-1B (Table IV). All of the cold formulations were kept in the refrigerator overnight at 38° F. Although the suspension was maintained, some water did migrate to the surface. Sample 312-1A (Table IV) exhibited the highest water level; Samples 312-H (single and double pass) and 312-J (Table IV), the lowest. In all cases, the emulsion could be easily reformed by simple hand stirring. The trials indicate that extrusion at higher temperatures enhances starch solubility in cold liquids.

Haake viscosity and particle size analyses were also utilized to compare certain samples with the control composition. These analyses were conducted on samples formulated for cold application testing. Haake viscosity at 25° C. was run 15 minutes after sample addition to the cold water. Results for the application tests conducted on the 313-2A, 313-2C, and 313-2H (all Table IV) samples are summarized as follows:

| Sample | Cold Application Tests | |
|---|---|---|
| | Haake Viscosity at 10 ± sec | Particle Size vol. mean diameter um |
| Control composition | 512 | 195.7 |
| 313-2A | 179 | 185.1 |
| 313-2C | 293 | 235.8 |
| 313-2H | 229 | 201.4 |
| negative control | 96 | 59.8 |

Although viscosity data for the test batches did not meet the value obtained for the control composition, they were substantially better than the products of Example 1.

Particle size distribution patterns were visually compared. Sample 313-2A (Table IV) seemed to have a distribution most similar to the control composition and in hot application tests performed most like the control. As noted with the prototype evaluation a day previous, the starch extruded at higher temperatures (313-2H, Table IV) hydrated more quickly and provide more viscosity in the cold formulations.

The extrusion trials demonstrated the ability of the extruders to process moderate moisture starch under relatively high pressure to produce a cold or hot water swellable product.

Example 4

Micorscopy

Two samples of the product of the invention, 313-2C and 314-3S (both Table IV) were examined by microscopy and comparative examinations were made of commercial pre-gelatinized corn starch and commercial, spray-dried, modified corn starch.

Two media were used for mounting the samples. Cargille liquid 1.604 (available from Cargille Laboratories, 55 Commerce Road, Cedar Grove, N.J. 07009 U.S.A.) is an oil with a refractive index of 1.604. The oil keeps the samples from dissolving or swelling. The refractive index, much higher than that of the particles, increases the contrast for viewing and photography. The other mountant was 1:1 glycerin to water. The water swells the particles, and the glycerin prevents evaporation. The swollen starch particles have a refractive index close to that of the mountant (glycerin and water) so the contrast was very low.

Sample 313-2C

Figure 16:
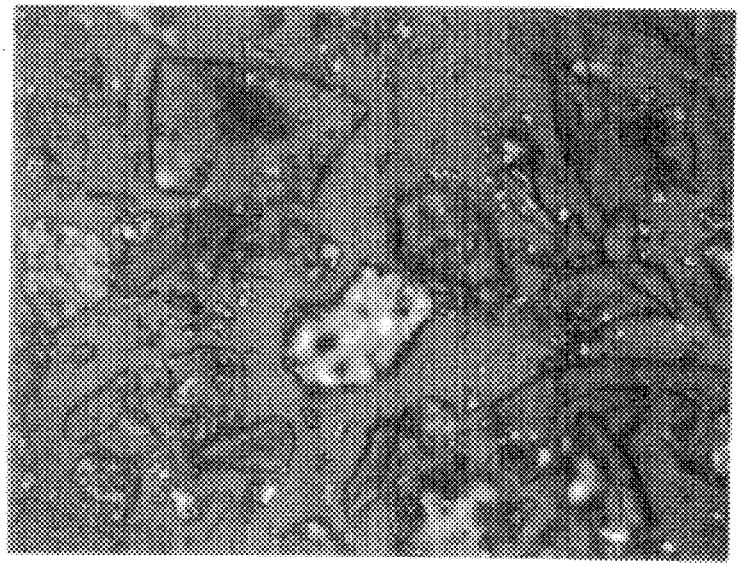
FIG. 16 is a photomicrograph of a product of the invention taken with partially crossed polarizing filters at 75×magnification in an oil media having a refractive index of 1.604.

Mounted in oil, the particles are colorless, transparent to translucent, irregular chips. With partially crossed polarizing filters, it can be seen in FIG. 16 that some of the particles are isotropic and others exhibit birefringence, seen as brightness. The small, bright particles with "Maltese crosses" are corn starch granules. The larger bright particles are aggregates of starch granules. To different degrees, the granules can still be distinguished in the larger aggregates, although the granules' crosses are sometimes distorted. In some particles only a few, faint, blurred, birefringent granules can be seen embedded in the isotropic matrix.

Figure 17:
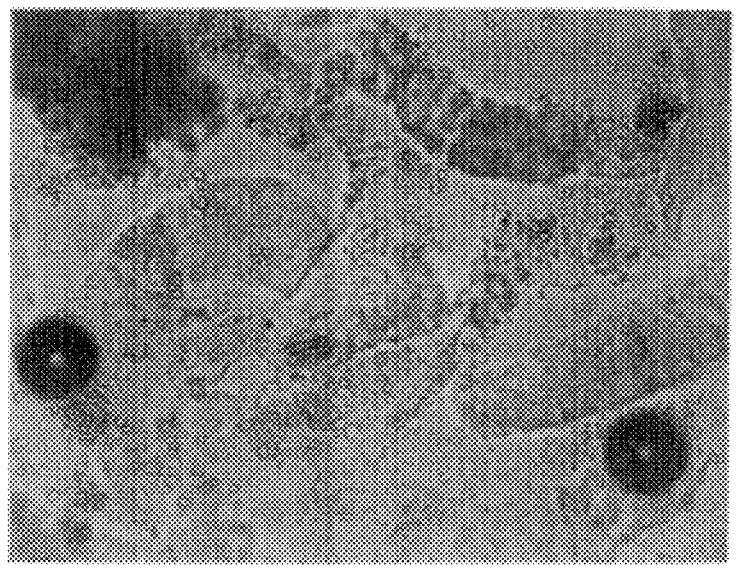
FIG. 17 is a photomicrograph of a product of the invention taken at 75×magnification in a glycerin and water media.
Figure 18:
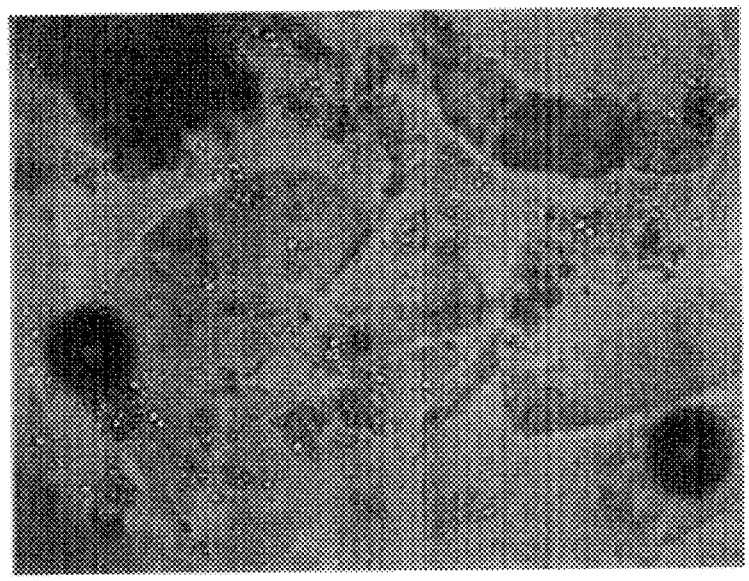
FIG. 18 is a photomicrograph of a product of the invention taken with partially crossed polarizing filters at 75×magnification in a glycerin and water media.

Mounted in glycerin and water, most of the particles swelled. The remaining, undamaged starch granules can be recognized by shape, harsher edge contrast, more "solid" appearance as seen in FIG. 17 and, with the polarizing filters crossed, by their residual birefringence as seen in FIG. 18. The completely gelled starch particles swell into soft, pulpy slabs with no birefringence and only a little texture. Faint graininess typical of gelled starch is seen and, in some swollen particles, faint, irregular striations. Of particular interest are the intermediate, partially gelled, partially swollen particles, those that have lost most of their birefringence but retained a lumpy texture. In these particles or portions of particles, clusters of swollen granules can be seen. The contrast is stronger in these areas. These areas of partial swelling vary from being quite distinct (swollen and even raw granules visible) to being crowded and pushed together so that no individual granules can be distinguished. It is thought that this component of the sample is important, to the thickening properties, as it has the ability to absorb water and swell yet retain some substance and strength.

Sample 314-3S

Figure 19:
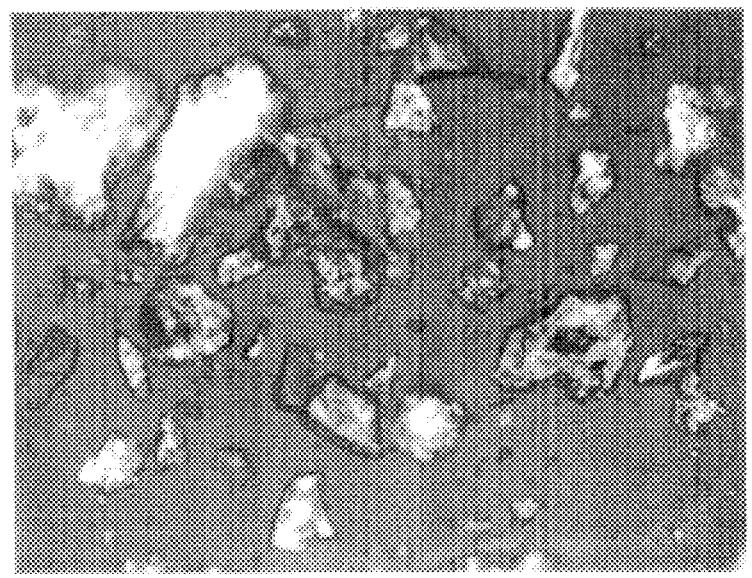
FIG. 19 is a photomicrograph of a product of the invention taken with partially crossed polarizing filters at 75×magnification in an oil media having a refractive index of 1.604.

This sample is similar to Sample 313-2C in that it contains the same inhomogeneous variety of particles, ranging from completely gelled starch to raw granules. However, this sample appears to contain a high amount of the intermediate, partially gelled particles. Mounted in oil, there are few free raw granules as seen in FIG. 19. There are also a few completely isotropic chips with absolutely no birefringence (brightness). However, many particles are aggregates of granules.

Figure 20:
FIG. 20 is a photomicrograph of a product of the invention taken at 75×magnification in a glycerin and water media.
Figure 21:
FIG. 21 a photomicrograph of a product of the invention taken with partially crossed polarizing filters at 75×magnification in a glycerin and water media.

Mounted in water and glycerin, this sample has the same types of particles as Sample 313-2C, but the ratio of the types is different. There is more of the partially swollen, lumpy material. FIG. 20 is a photomicrograph of the sample in glycerin and water and FIG. 21 is a photomicrograph of the sample in glycerin and water taken with the polarizing filters.

Commercial Pre-gelatinized Corn Starch

Figure 22:
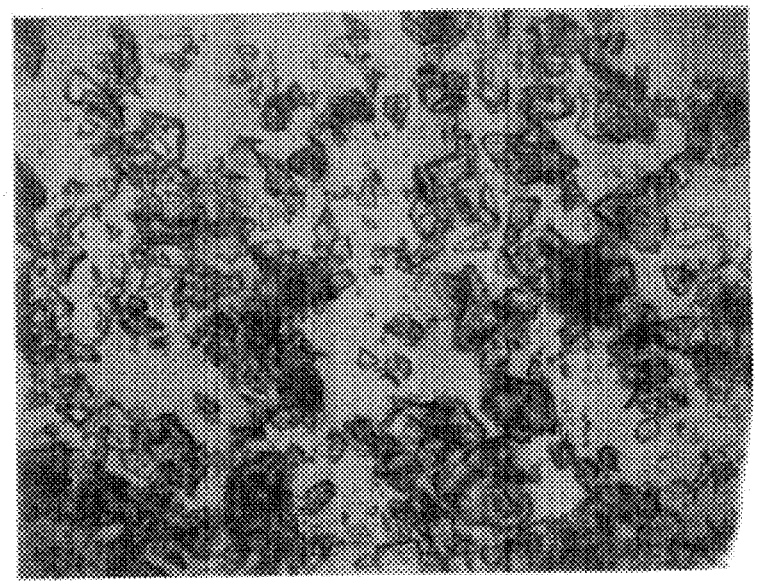
FIG. 22 is a photomicrograph of a commercial pre-gelatinized corn starch taken with partially crossed polarizing filters at 75×magnification in an oil media having a refractive index of 1.604.

This product was examined for comparison. Mounted in oil, it is seen to contain similar chip morphology to the product of the invention (although it has been ground to a smaller average particle size). With partially crossed polarizers, however, it is seen to contain no birefringent particles, neither individual granules nor aggregates as seen in FIG. 22. The particles are uniformly isotropic. This product is quite uniform in degree of starch gelling, i.e. it is completely gelled.

Figure 23:
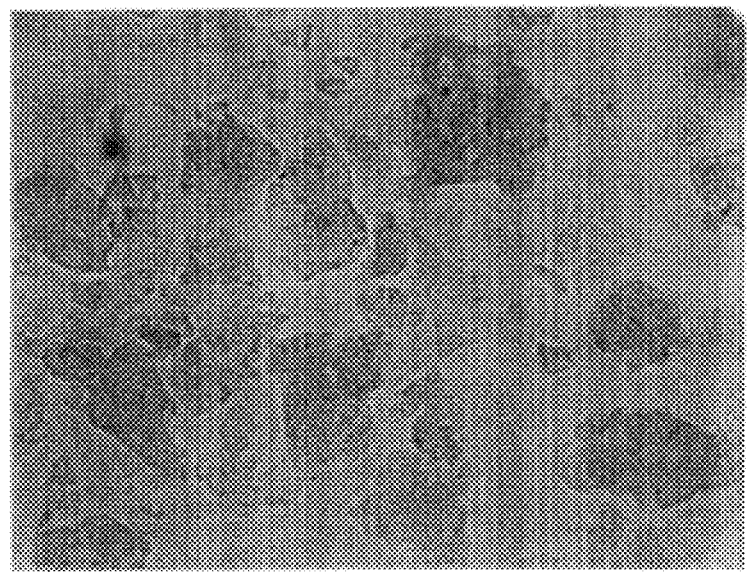
FIG. 23 is a photomicrograph of a commercial pre-gelatinized corn starch taken at 75×magnification in a glycerin and water media.
Figure 24:
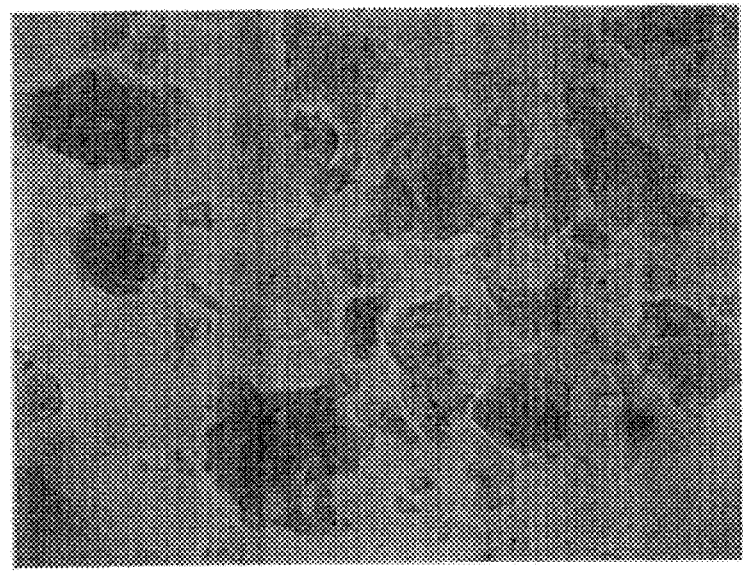
FIG. 24 is a photomicrograph of a commercial pre-gelatinized corn starch taken with partially crossed polarizing filters at 75×magnification in a glycerin and water media.

Mounted in water and glycerin, the particles uniformly swell into soft slabs with only a faint, fine, grainy texture. No hint of granules remains. FIG. 23 is a photomicrograph of the sample in glycerin and water and FIG. 24 is a photomicrograph of the sample in glycerin and water taken with the polarizing filters.

Commercial, Spray-dried, Modified Corn Starch

Figure 25:
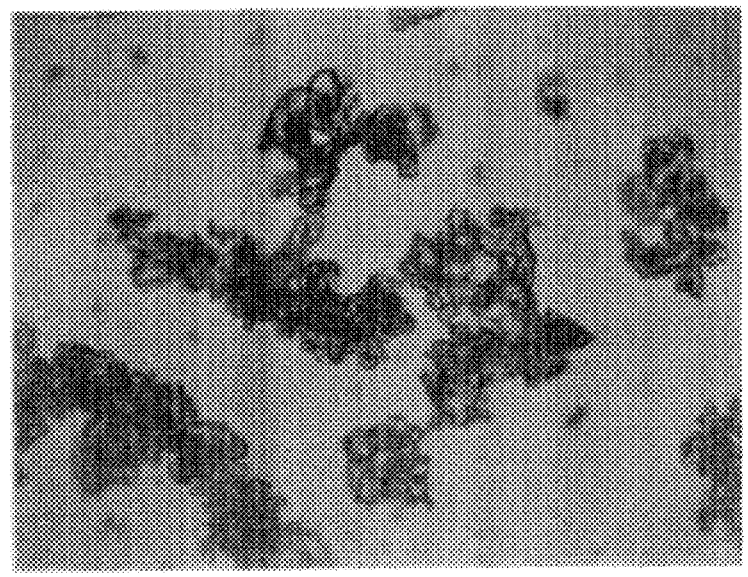
FIG. 25 is a photomicrograph of a commercial, spray-dried, modified starch taken with partially crossed polarizing filters at 75×magnification in an oil media having a refractive index of 1.604.

This product also was examined for comparison. Mounted in oil, the particles are seen to be completely isotropic as seen in FIG. 25. The particles show the entrapped air bubbles typical for spray dried materials. Spray drying also results in rounded particles. This effect can be seen to some degree in these particles. They are not simple spheres, but they do have generally rounded shapes.

Figure 26:
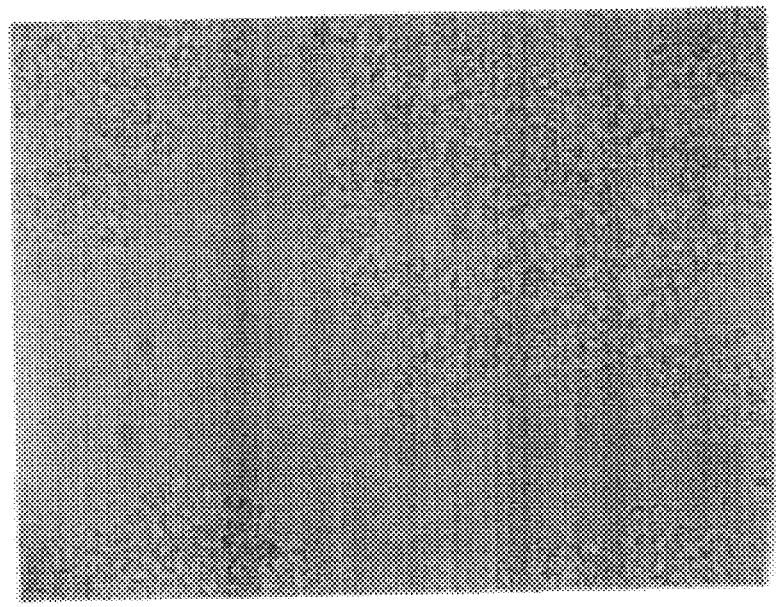
FIG. 26 is a photomicrograph of a commercial, spray-dried, modified starch taken at 75×magnification in a glycerin and water media.
Figure 27:
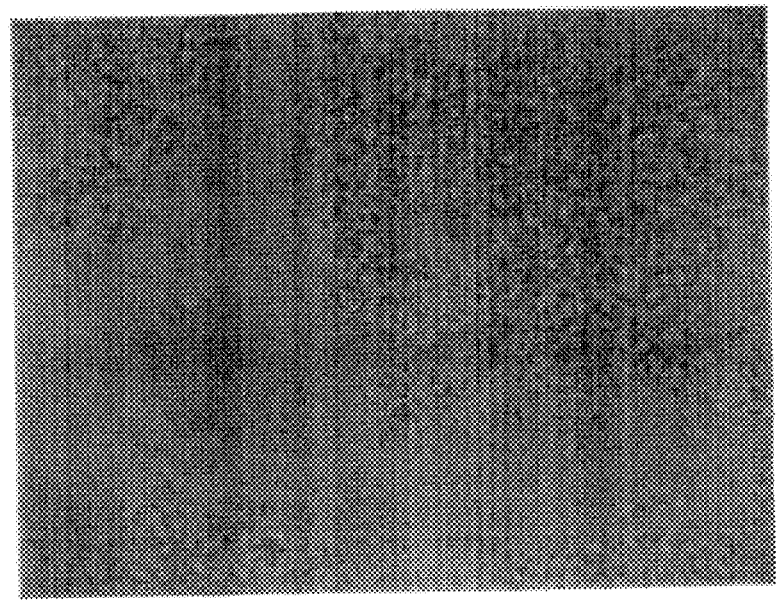
FIG. 27 is a photomicrograph of a commercial, spray-dried, modified starch taken with partially crossed polarizing filters at 75×magnification in a glycerin and water media.

Mounted in water and glycerin, this product swells uniformly. No birefringence remains, but chemical modification restricts the swelling so that the granules retain some integrity. The swollen particles have a lumpy texture similar to the product of the invention, but produced by chemical treatment. FIG. 26 is a photomicrograph of the sample in glycerin and water and FIG. 27 is a photomicrograph of the sample in glycerin and water taken with the polarizing filters.

Example 5

Agglomeration

An agglomeration method was developed to prepare a composition useful in instantized applications and the method can be used with the physically modified products of the invention and with other starch containing materials such as fully pre-gelatinized starches. The method requires a specific ingredient addition sequence. A core component such as a crystalline highly soluble material, a sugar or a derivative of sugar is placed in a mixer and water is added in an amount from about 0.5% to about 3.5% by weight of the total weight of the ingredients, excluding the weight of the added water. The core component and added water then are blended by mixing. The amount of core component employed is from about 7% to about 69%, based on total ingredient weight excluding added water, and depending on the amounts of other ingredients the core material can be present in an amount from about 9 to about 69%, preferably from about 7 to about 52%. Suitable core components are selected from the group consisting of dextrose, sucrose, fructose, maltose, lactose, galactose and other mono- and di-saccharides. Sugar alcohols also can be used.

The next component which is added to the mixer is a non-crystalline soluble material. Suitable materials of this type are selected from the group consisting of maltodextrins, corn syrup solids, polydextrose and soluble dextrins. The non-crystalline soluble material is added in an amount from about 1% to about 20%, preferably from about 3% to about 10%, based on total ingredient weight excluding added water. This component and the others then are blended by mixing.

The last component which is added to the mixer is a starch containing material such as the physically modified product of the invention or a fully pre-gelatinized starch or the like. This component is added in an amount from about 90% to about 30%, preferably from about 90% to about 45%, based on the total ingredient weight excluding added water. This component and the others then are blended by mixing to make the agglomerated product of the invention.

The experimental work utilized a bench-top Hobart mixer. A crystalline, highly soluble material (such as sugar) is wetted sufficiently to provide a core onto which an intermediary ingredient, soluble but not crystalline (such as maltodextrin) is then blended. Finally, the primary component (the product of the invention) is added to the system. The order of addition and degree of blending are critical to produce a granular type product that is homogeneous, flowable and easy to disperse in hot media. The concentration of ingredients is adjusted to yield the highest starch load. Carrier ingredients are selected for their morphology, ease of solubility and appropriateness in the application being formulated.

The formula tested consisted of 33% sugar, 60% of the product of the invention and 7% maltodextrin. The sequence of steps was as follows:

1. Place sugar in Hobart mixer.
2. Sprinkle water on the sugar in an amount equal to 2.5% of the total dry ingredients, i.e., for a blend of 50 grams of sugar, 90 grams of extruded starch and 10 grams of maltodextrin the water would equal 3.75 grams (2½% of 150 grams).
3. Mix on speed 2 until completely blended.
4. Add maltodextrin while mixing at low speed.
5. Mix on speed 2 until completely blended.
6. Add extruded starch while mixing at low speed.
7. Mix on speed 2 until completely blended.

This agglomeration procedure in combination with the formulation noted above results in a premix having the following characteristics:

1. A good granular appearance and stability of the blended ingredient.
2. A homogeneous mixture which does not stratify.
3. Premix is flowable and easy to measure.

TABLE I

WENGER TX 80 SCREW ELEMENT CONFIGURATION

| ELEMENT | | TYPE |
|---|---|---|
| DIE END | | |
| 1 | FIG. 4 | CONE SCREW |
| 2 | FIG. 11 | THICK SHEARLOCK |
| 3 | FIG. 12 | THICK SHEARLOCK |
| 4 | FIG. 13 | THICK SHEARLOCK |
| 5 | FIG. 12 | THICK SHEARLOCK |
| 6 | FIG. 11 | THICK SHEARLOCK |
| 7 | FIG. 12 | THICK SHEARLOCK |
| 8 | FIG. 5 | FULL PITCH SCREW |
| 9 | FIG. 5 | FULL PITCH SCREW |
| 10 | FIG. 5 | FULL PITCH SCREW |
| 11 | FIG. 5 | FULL PITCH SCREW |
| 12 | FIG. 5 | FULL PITCH SCREW |
| 13 | FIG. 5 | FULL PITCH SCREW |
| 14 | FIG. 5 | FULL PITCH SCREW |
| 15 | FIG. 6 | FULL PITCH SCREW |
| 16 | FIG. 12 | THICK SHEARLOCK |
| 17 | FIG. 11 | THICK SHEARLOCK |
| 18 | FIG. 12 | THICK SHEARLOCK |
| 19 | FIG. 13 | THICK SHEARLOCK |
| 20 | FIG. 12 | THICK SHEARLOCK |
| 21 | FIG. 11 | THICK SHEARLOCK |
| 22 | FIG. 5 | FULL PITCH SCREW |
| 23 | FIG. 5 | FULL PITCH SCREW |
| 24 | FIG. 5 | FULL PITCH SCREW |
| 25 | FIG. 5 | FULL PITCH SCREW |
| DRIVE END | | |

TABLE II

WENGER TX 52 SCREW ELEMENT CONFIGURATION

| ELEMENT | | TYPE |
|---|---|---|
| DIE END | | |
| 1 | FIG. 9 | TRIPLE FLIGHT CONE SCREW |
| 2 | FIG. 8 | ½ PITCH SCREW 6 UNITS |
| 3 | FIG. 15 | THIN SHEARLOCK |
| 4 | FIG. 14 | THIN SHEARLOCK |
| 5 | FIG. 15 | THIN SHEARLOCK |
| 6 | FIG. 14 | THIN SHEARLOCK |
| 7 | FIG. 15 | THIN SHEARLOCK |
| 8 | FIG. 13 | THICK SHEARLOCK |
| 9 | FIG. 12 | THICK SHEARLOCK |
| 10 | FIG. 11 | THICK SHEARLOCK |
| 11 | FIG. 15 | THIN SHEARLOCK |
| 12 | FIG. 14 | THIN SHEARLOCK |
| 13 | FIG. 8 | ½ PITCH SCREW 6 UNITS |
| 14 | FIG. 7 | ½ PITCH SCREW 9 UNITS |
| 15 | FIG. 14 | THIN SHEARLOCK |
| 16 | FIG. 15 | THIN SHEARLOCK |
| 17 | FIG. 14 | THIN SHEARLOCK |
| 18 | FIG. 15 | THIN SHEARLOCK |
| 19 | FIG. 14 | THIN SHEARLOCK |
| 20 | FIG. 15 | THIN SHEARLOCK |
| 21 | FIG. 14 | THIN SHEARLOCK |
| 22 | FIG. 15 | THIN SHEARLOCK |
| 23 | FIG. 14 | THIN SHEARLOCK |
| 24 | FIG. 15 | THIN SHEARLOCK |
| 25 | FIG. 14 | THIN SHEARLOCK |
| 26 | FIG. 7 | ½ PITCH SCREW 9 UNIT |
| 27 | FIG. 7 | ½ PITCH SCREW 9 UNIT |
| 28 | FIG. 3 | ¾ PITCH SCREW 9 UNIT |
| 29 | FIG. 3 | ¾ PITCH SCREW 9 UNIT |
| 30 | FIG. 3 | ¾ PITCH SCREW 9 UNIT |
| 31 | FIG. 10 | ¾ PITCH SCREW 4.5 UNIT |
| DRIVE END | | |

TABLE III

EXTRUSION RUN DATA FOR WENGER TX 52

| RUN # | ADDITIVE | ADDITIVE % AS IS | FEEDER RPM | PRODUCT KG/HR | WATER KG/HR | % LOAD | DEG C. @DIE | BARREL RPM | PSIG CONE/DIE | COMMENTS |
|---|---|---|---|---|---|---|---|---|---|---|
| 3401-1,2 | NONE | 0 | 10 | 42.9 | 0 | 27 | 120 | 160 | 200/400 | ¾ INCH ADJUSTABLE DIE 50 LB BATCH SIZE SAMPLE DISPERSED IN H2O |
| | PLUGGED AT HIGHER PRESS - CHANGE DIE TO 5 HOLE DIE OPENING | | | | | | | | | |
| 3401-3 | NONE | 0 | 7 | 30.1 | 0 | 28 | 122 | 164 | 200/500 | PRECONDITIONER RPM = 82 |
| 3401-3 | NONE | 0 | 5 | 21.5 | 0 | 24 | 122 | 164 | 200/500 | 5 HOLE DIE-5 MM HOLES |
| | PLUGGED AT HIGH PRESS-HAD TO CONTINUALLY DECREASE FEED RATE-NOT ENOUGH MOISTURE | | | | | | | | | PRECONDITIONER RPM = 164 |
| 3401-4 | NONE | 0 | 10 | 42.9 | 3.4 | 33 | 120 | 162 | 400/600 | START PRESS 700,1000 |
| 3401-5 | NONE | 0 | 8 | 34.3 | 2.6 | 33 | 120 | 157 | 300/600 | |
| 3401-4 | NONE | 0 | 8 | 34.3 | 3.3 | 33 | 120 | 161 | 300/600 | PRODUCT RATE: |
| 3401-5MD | 1910 | 5 | 8 | 34.3 | 3.3 | 30 | 120 | 150 | 400/500 | 100 SEC @ 8 RPM = |
| 3401-5MD | 1910 | 5 | 8 | 34.3 | 3.2 | 30 | 120 | 162 | 400/500 | 1040 GRAMS |
| 3401-10MD1 | 1910 | 10 | 8 | 34.3 | 3.2 | 26 | 120 | 202 | 200/500 | |
| 3401-10MD2 | 1910 | 10 | 8 | 34.3 | 3.2 | 26 | 120 | 202 | 200/500 | |
| 3401-10MD3 | 1910 | 10 | 8 | 34.3 | 3.2 | 26 | 120 | 202 | 200/500 | 12 MINUTE WAIT |
| 3401-10MD4 | 1910 | 10 | 8 | 34.3 | 3.3 | 28 | 120 | 202 | 200/500 | BETWEEN INGREDIENT |
| 3401-10MD5 | 1910 | 10 | 8 | 34.3 | 3.3 | 28 | 120 | 202 | 200/500 | INTRODUCTION AND |
| 3401-15MD1 | 1910 | 15 | 8 | 34.3 | 3.3 | 32 | 120 | 202 | 200/500 | EXTRUDATE SAMPLING |
| 3401-15MD1 | 1910 | 15 | 8 | 34.3 | 3.3 | 32 | 120 | 202 | 200/500 | PRECONDITIONER RPM = |
| 3401-15MD2 | 1910 | 15 | 8 | 34.3 | 3.3 | 32 | 120 | 202 | 200/500 | 82 |
| | EXTRUDER BARREL PLUGGED | | | | | | | | | |
| 3401-20MD1 | 1910 | 20 | 9 | 38.8 | 3.4 | 30 | 120 | 204 | 225/400 | |
| 3401-20MD1 | 1910 | 20 | 9 | 38.8 | 3.4 | 48 | 120 | 213 | 200/400 | |
| | PLUG-UP - DISCARDED REMAINDER OF 3401-20MD1 | | | | | | | | | |
| 3401-1081 | SUCROSE | 10 | 8 | 34.3 | 5.1 | 30 | 121 | 170 | 400/500 | |
| 3401-1081 | SUCROSE | 10 | 8 | 34.3 | 4.8 | 32 | 121 | 170 | 400/600 | |
| 3401-1082 | SUCROSE | 10 | 8 | 34.3 | 4.5 | 30 | 120 | 170 | 300/500 | |
| 3401-1083 | SUCROSE | 10 | 8 | 34.3 | 3.5 | 33 | 120 | 170 | 300/500 | |
| 3401-1084 | SUCROSE | 10 | 8 | 34.3 | 3.4 | 33 | 120 | 170 | 300/500 | |
| | 3401 = CORN PRODUCTS UNMODIFIED FOOD GRADE CORN STARCH | | | | | | | | | |
| | 1910 = CASCO 19 DE MALTODEXTRIN | | | | | | | | | |
| | MD = CASCO 1910 - 10 DE MALTODEXTRIN | | | | | | | | | |
| | S = SUCROSE | | | | | | | | | |
| 3401-25OX71-1 | 7071 | 25 | 8 | 34.3 | 5.2 | 32 | 120 | 170 | 250/500 | PRODUCT CODE 70714 |
| 3401-25OX71-1 | 7071 | 25 | 8 | 34.3 | 5.2 | 28 | 120 | 170 | 250/500 | PRECONDITIONER RPM = |
| 3401-25OX71-2 | 7071 | 25 | 8 | 34.3 | 3.3 | 37 | 120 | 170 | 250/500 | 164 |
| 3401-25OX71-3 | 7071 | 25 | 8 | 34.3 | 3.4 | 40 | 120 | 166 | 200/400 | |
| 3401-25OX71-4 | 7071 | 25 | 8 | 34.3 | 3.4 | 40 | 120 | 168 | 200/400 | |
| | PLUGGED DUE TO PRODUCT CHANGE | | | | | | | | | |
| 3401-18MD481 | MD/SUC | 10/5 | 8 | 34.3 | 4.8 | 31 | 120 | 171 | 200/400 | |
| 3401-18MD481 | MD/SUC | 10/5 | 8 | 34.3 | 4.7 | 30 | 120 | 171 | 200/400 | |
| 3401-18MD482 | MD/SUC | 10/5 | 8 | 34.3 | 4.7 | 30 | 120 | 171 | 200/400 | |
| 3401-18MD483 | MD/SUC | 10/5 | 8 | 34.3 | 3.7 | 30 | 120 | 172 | 250/500 | |
| | PRODUCT CHANGE | | | | | | | | | |
| 3401-LX-1 | L & X | 2/2 | 9 | 38.6 | 5.1 | 30 | 120 | 172 | 200/400 | |
| 3401-LX-2 | L & X | 2/2 | 9 | 38.4 | 3.4 | 29 | 120 | 172 | 250/500 | PRECONDITIONER RPM = 164 |
| 3401-LX-3 | L & X | DIE PLUGGED | | | | | | | | |
| 3401-LX-4 | L & X | 2/2 | 8 | 34.3 | 4.9 | 37 | 122 | 170 | 400/500 | |
| | PRODUCT CHANGE | | | | | | | | | |
| 3401-LXSSL-1 | L,X,SSL | 2/2/2 | 8 | 34.3 | 4.5 | 37 | 120 | 170 | 400/600 | |
| 3401-LXSSL-2 | L,X,SSL | 2/2/2 | 9 | 38.4 | 4.5 | 37 | 120 | 170 | 400/600 | |
| 7071 | NONE | 0 | 9 | 38.6 | 6.8 | 13 | 125 | 170 | 0/0 | PASTY EXTRUDATE 7071 DEXTRIN |
| | END OF RUN | | | | | | | | | |
| | 7071 - CASCO 7071 DEXTRIN - 96% SOL. | | | | | | | | | |
| | MD - CASCO 1910 - 10 DE MALTODEXTRIN | | | | | | | | | |
| | SUC - SUCROSE | | | | | | | | | |
| | L - LOCUST BEAN GUM | | | | | | | | | |
| | X - XANTHAN GUM | | | | | | | | | |
| | SSL - SODIUM STEAROYL LACTYLATE | | | | | | | | | |

EXTRUSION RUN DATA FOR WENGER TX 52

| RUN # | ADDITIVE | ADDITIVE % AS IS | FEEDER RPM | PRODUCT KG/HR | WATER KG/HR | % LOAD | DEG C. @DIE | BARREL RPM | CONDITIONER RPM | PSIG CONE/DIE | COMMENTS |
|---|---|---|---|---|---|---|---|---|---|---|---|
| WAXY-1 | NONE | 0 | 9 | 38.6 | 5.3 | 25 | 120 | 170 | 106 | 150/400 | |
| WAXY-2 | NONE | 0 | 9 | 38.4 | 5.2 | 25 | 120 | 170 | 106 | 150/400 | |
| WAXY-3 | NONE | 0 | 9 | 38.4 | 3.4 | 27 | 120 | 166 | 103 | 100/300 | LIGHT |

TABLE III-continued

| | | | | | | | | | | | |
|---|---|---|---|---|---|---|---|---|---|---|---|
| WAXY-3 | NONE | 0 | 9 | 38.4 | 3.2 | 22 | 120 | 166 | 103 | 100/300 | COLORED |
| WAXY-4 | NONE | 0 | 9 | 38.4 | 3.2 | 25 | 120 | 168 | 103 | 100/300 | EXTRUDATE |
| WAXY LX-1 | L & X | 2/2 | 9.5 | 40.7 | 5.3 | 26 | 120 | 168 | 100 | 150/400 | |
| WAXY LX-2 | L & X | 2/2 | 9 | 38.8 | 3.2 | 25 | 120 | 169 | 94 | 100/350 | |
| WAXY LX-3 | L & X | 2/2 | 9.5 | 40.7 | 3.2 | 35 | 120 | 168 | 93 | 100/250 | |
| WAXY LX-4 | L & X | 2/2 | 9.5 | 40.7 | 3.2 | 35 | 120 | 168 | 93 | 100/250 | |
| WAXY LX-5 | L & X | 2/2 | 9.8 | 40.7 | 3.2 | 35 | 120 | 168 | 93 | 100/250 | |
| WAXY LXSSL-1 | L,X,SSL | 2/2/2 | 9.5 | 40.7 | 5.2 | 20 | 120 | 171 | 72 | 150/350 | |
| WAXY LXSSL-2 | L,S,SSL | 2/2/2 | 9.5 | 40.7 | 3.2 | 18 | 120 | 189 | 72 | 150/350 | |
| WAXY LXSSL-3 | L,S,SSL | 2/2/2 | 7 | 30.0 | 3.4 | 18 | 120 | 188 | 33 | 150/350 | |
| WAXY LXSSL-4 | L,S,SSL | 2/2/2 | 7 | 30.0 | 3.1 | 18 | 120 | 188 | 33 | 150/350 | |
| | 3401 FLUSH 10 MIN | | | | | | | | | | |
| 3401-HG-1 | HG | 2 | 9 | 38.4 | 5.3 | 34 | 120 | 162 | 36 | 300/500 | |
| 3401-HG-1 | HG | 2 | 9 | 38.4 | 4.9 | 30 | 120 | 162 | 38 | 200/400 | |
| 3401-HG-2 | HG | 2 | 9 | 38.4 | 3.2 | 26 | 120 | 162 | 26 | 200/400 | |
| 3401-HG-2 | HG | 2 | 9 | 38.4 | 3 | 25 | 120 | 162 | 36 | 200/400 | |
| 3401-HG-3 | HG | 2 | 9 | 38.4 | 2.9 | 25 | 120 | 162 | 38 | 200/400 | |
| | EXTRUDER PLUG UP | | | | | | | | | | |
| | WAXY - WAXY CORN STARCH | | | | | | | | | | |
| | L - LOCUST BEAN GUM | | | | | | | | | | |
| | X - XANTHAN GUM | | | | | | | | | | |
| | SSL - SODIUM STEAROYL LACTATE | | | | | | | | | | |
| | HG - HYDRATED GUM COMBINATION | | | | | | | | | | |
| 3401-HG-1 | HG | 2 | 7.5 | 32.2 | 5.1 | 30 | 120 | 175 | 78 | 150/400 | |
| 3401-HG-1 | HG | 2 | 7.5 | 32.2 | 5.1 | 30 | 120 | 175 | 78 | 150/400 | |
| 3401-HG-2 | HG | 2 | 7.5 | 32.2 | 3.9 | 30 | 120 | 175 | 88 | 150/400 | |
| 3401-HG-2 | HG | 2 | 9.5 | 40.7 | 3.6 | 30 | 120 | 175 | 98 | 150/400 | |
| 3401-HG-3 | HG | 2 | 9.5 | 40.7 | 3.4 | 30 | 120 | 175 | 98 | 150/400 | |
| 3401-WX-S-1 | W & S | 10/10 | 8.5 | 38.4 | 5.3 | 39 | 120 | 175 | 98 | — | |
| | EXTRUDER DIE PLUG UP | | | | | | | | | | |
| 3401-WX-S-2 | W & S | 10/10 | 7.5 | 32.2 | 5.2 | 34 | 120 | 177 | 98 | — | |
| 3401-WX-S-2 | W & S | 10/10 | 7.5 | 32.2 | 5 | 37 | 120 | 184 | 98 | 150/400 | |
| 3401-WX-S-3 | W & S | 10/10 | 8.5 | 36.4 | 4.4 | 35 | 120 | 176 | 98 | 150/400 | |
| 3401-WX-S-3 | W & S | 10/10 | 8 | 34.3 | 4.2 | 38 | 120 | 177 | 98 | 150/400 | |
| | HG - HYDRATED GUM COMBINATION | | | | | | | | | | |
| | WX - WAXY STARCH AMISOL 4000 | | | | | | | | | | |
| | S - SUCROSE | | | | | | | | | | |
| | W - WAXY STARCH AMISOL 4000 | | | | | | | | | | |
| 3401 LXSSL-1 | L,X,SSL | 2/2/2 | 10 | 42.9 | 5.2 | 38 | 120 | 172 | 97 | 300/500 | |
| 3401 LXSSL-1 | L,X,SSL | 2/2/2 | 10 | 42.9 | 5.3 | 38 | 120 | 172 | 97 | 300/500 | |
| 3401 LXSSL-2 | L,X,SSL | 2/2/2 | 8 | 34.3 | 3.4 | 27 | 120 | 174 | 97 | 200/400 | |
| 3401 LXSSL-2 | L,X,SSL | 2/2/2 | 8 | 34.3 | 3.4 | 29 | 120 | 175 | 97 | 200/400 | |
| 3401 LXSSL-3 | L,X,SSL | 2/2/2 | 9 | 38.6 | 3.4 | 31 | 120 | 178 | 97 | 200/400 | |
| 3401 LXSSL-4 | L,X,SSL | 2/2/2 | 8.5 | 36.4 | 3.3 | 29 | 120 | 181 | 97 | 200/400 | |
| 3401 LXSSL-4 | L,X,SSL | 2/2/2 | 8.5 | 36.4 | 3.3 | 29 | 120 | 181 | 97 | 200/400 | |
| 3401 MD-S-1 | MD,S | | 8.5 | 36.4 | 5.2 | 28 | 120 | 176 | 97 | 200/400 | PRODUCT HOT |
| 3401 MD-S-2 | MD,S | | 8.5 | 36.4 | 3.5 | 24 | 120 | 177 | 97 | 150/400 | |
| 3401 MD-S-3 | MD,S | | 8.5 | 36.4 | 3.6 | 27 | 120 | 177 | 97 | 200/400 | |
| 3401 MD-S-3 | MD,S | | 8.5 | 36.4 | 3.6 | 25.5 | 120 | 178 | 97 | 200/400 | |
| 3401 DX71-S-1 | DX71,8 | | 9 | 38.6 | 5.4 | 27 | 120 | 173 | 97 | 200/400 | PUFFY WHITE |
| 3401 DX71-S-2 | DX71,8 | | 9 | 38.6 | 3.4 | 27 | 120 | 173 | 97 | 200/400 | EXTRUDATE |
| | EXTRUDER PLUG UP | | | | | | | | | | |
| 3401 MD SS-1 | MD,S | | 9 | 38.6 | 3.8 | 36 | 120 | 173 | 97 | 200/400 | |
| 3401 MD SS-1 | MD,S | | 9.5 | 40.7 | 5.1 | 27 | 120 | 173 | 102 | 300/500 | |
| 3401 MD SS-2 | MD,S | | 8.5 | 36.4 | 3.4 | 27 | 120 | 173 | 102 | 150/400 | |
| 3401 MD SS-2 | MD,S | | 8.5 | 36.4 | 3.4 | 30 | 120 | 174 | 99 | 150/400 | |
| 3401 MD SS-3 | MD,S | | 8.5 | 36.4 | 3.4 | 30 | 120 | 173 | 99 | 150/400 | |
| 3401 MD SS-4 | MD,S | | 8.5 | 36.4 | 3.4 | 30 | 120 | 173 | 99 | 150/400 | |
| | L - LOCUST BEAN GUM | | | | | | | | | | |
| | X - XANTHAN GUM | | | | | | | | | | |
| | SSL - SODIUM STEAROYL LACTATE | | | | | | | | | | |
| | MD - CASCO 1910 - 10 DE MALTODEXTRIN | | | | | | | | | | |
| | DX71 - CASCO 7071 DEXTRIN | | | | | | | | | | |
| | S - SUCROSE | | | | | | | | | | |

TABLE IV

EXTRUSION RUN DATA FOR WENGER TX 80

| RUN # | AD-DITIVE | AD-DITIVE % AS-IS | FEED-ER RPM | WATER LB/MIN | FEED LB/HR | % LOAD | DEG F. @DIE | DEG F. @CONE | BARREL RPM | PSIG @DIE | COMMENTS |
|---|---|---|---|---|---|---|---|---|---|---|---|
| 312-1A | NONE | 0 | 17 | 0.47 | 277 | 48 | 180–188 | 113–119 | 154 | 1450 | COOLING WATER ON |
| 312-1B | NONE | 0 | 17 | 0.408 | 277 | 43 | 195–200 | 130–146 | 154 | 1500 | COOLING WATER OFF |

TABLE IV-continued

EXTRUSION RUN DATA FOR WENGER TX 80

| RUN # | AD-DITIVE | AD-DITIVE % AS-IS | FEED-ER RPM | WATER LB/MIN | FEED LB/HR | % LOAD | DEG F. @DIE | DEG F. @CONE | BARREL RPM | PSIG @DIE | COMMENTS |
|---|---|---|---|---|---|---|---|---|---|---|---|
| 312-1C | NONE | 0 | 17 | 0.408 | 277 | 42 | 230–235 | 157–164 | 154 | 1350 | |
| 312-1C | NONE | 0 | 17 | 0.408 | 277 | 42 | 230–235 | 157–164 | 154 | 1380 | |
| 312-1D | NONE | 0 | 17 | 0.432 | 277 | 56 | 247–253 | 151–157 | 157 | 1400 | ADJ. COOLING WATER |
| 312-1D | NONE | 0 | 17 | 0.432 | 277 | 58 | 247–253 | 151–157 | 157 | 1400 | |
| 312-1E | NONE | 0 | 17 | 0.419 | 277 | 44 | 244–284 | 144–150 | 157 | 1400 | ADJ. COOLING WATER |
| 312-1F | NONE | 0 | 17 | 0.419 | 277 | 49 | 233–234 | 151–154 | 157 | 1300 | MORE THAN ONE COOLING SECTION ON |
| 312-1G | NONE | 0 | 17 | 0.419 | 277 | 48 | 245–253 | 146–145 | 155 | 1500 | |
| 312-1H | NONE | 0 | 17 | 0.419 | 277 | 45 | 253–259 | 174–181 | 155 | 1400 | 1.9 LB/MIN H2O |
| 312-1H1 | NONE | 0 | 17 | 0.419 | 277 | 43 | 244–254 | 172–178 | 158 | 1278 | COOLING WATER |
| 312-1H2 | NONE | 0 | 17 | 0.419 | 277 | 43 | 255–250 | 177–181 | 154 | 1250 | |
| 312-1H2 | NONE | 0 | 17 | 0.419 | 277 | 42 | 254–260 | 181–182 | 154 | 1200 | |
| 312-1H3 | NONE | 0 | 17 | 0.419 | 277 | 41 | 257–260 | 180–181 | 154 | 1200 | 0.2 LB/MIN COOLING WATER |
| 312-1J | NONE | 0 | 17 | 0.419 | 277 | 42 | 251–264 | 182–187 | 155 | 1260 | |
| 312-1J | NONE | 0 | 17 | 0.584 | 277 | | | | | | EXTRUDER CHOKE-UP |
| NONE - USING ONLY CORN PRODUCTS 3401 UNMODIFIED FOOD GRADE STARCH | | | | | | | | | | | |
| 313-2A | NONE | 0 | 17 | 0.408 | 277 | 39 | 172–176 | 116–118 | 153 | 1600 | EXTRUSION STABLE |
| 313-2C | NONE | 0 | 17 | 0.419 | 277 | 38–48 | 230–238 | 148–175 | 155–158 | 1300–1500 | 1.7 LB/MIN WATER COOLING |
| 313-2H | NONE | 0 | 16 | 0.419 | 261 | 39–43 | 249–257 | 178–181 | 155–157 | 1200–1500 | 8.9 LB/MIN WATER COOLING |
| 313-2M | NONE | 0 | 16 | 0.56 | 261 | 40 | 258–266 | 182–187 | 157 | 1400 | ONE FULL TURN PLUS 90 DEGREES IN ONE DIE ADJ. |
| 313-2N | NONE | 0 | 17 | 0.56 | 277 | 46 | 205–200 | 134–129 | 158 | 1500 | |
| NONE - USING ONLY CORN PRODUCTS 3401 UNMODIFIED FOOD GRADE STARCH | | | | | | | | | | | |
| 314-3P | NONE | 0 | 17 | 0.269 | 277 | 46–48 | 203–209 | 126–136 | 155–158 | 1400–1500 | DIE RETURNING TO PREV. SETTING |
| 314-3Q | NONE | 0 | 17 | 0.269 | 277 | 45 | 230–238 | 131 | 155 | 1500 | |
| 314-3R | NONE | 0 | 17 | 0.289 | 277 | 44 | 255–260 | 138 | 155 | 1500 | |
| 314-3S | NONE | 0 | 17 | 1.455 | 277 | 43–49 | 214–225 | 189–195 | 158 | 700 | |
| 10% XANTHAN GUM | | | | | | | | | | | |
| 314-3T | X | 10 | 17 | 1.455 | 277 | 42–43 | 233–235 | 187–188 | 155 | 700 | ROPY & WET EXTRUDATE |
| 2.5% LOCUST BEAN & 2.5% XANTHAN GUM | | | | | | | | | | | |
| 314-3U | L & X | 2.5/2.5 | 17 | 0.902 | 277 | 45 | 228 | 183 | 157 | 1200 | |
| 314-3V | L & X | 2.5/2.5 | 17 | 0.902 | 277 | 47 | 235 | 188 | 158 | 1200 | |
| 314-3W | L & X | 2.5/2.5 | 17 | 0.902 | 277 | 43 | 243 | 189 | 155 | 1200 | |
| 314-3X | L & X | 2.5/2.5 | 18 | 0.902 | 294 | 41 | 243 | 195 | 154 | 1200 | |
| 314-3Y | L & X | 2.5/2.5 | 18 | 0.902 | 294 | 40 | 254 | 194 | 155 | 1150 | |
| 314-3Y | L & X | 2.5/2.5 | 18 | 0.902 | 294 | 39 | 257 | 197 | 157 | 1150 | |
| 5% XANTHAN GUM | | | | | | | | | | | |
| 314-3Z | X | 5 | 16 | 0.781 | 261 | 45 | 228 | 178 | 159 | 1200 | |
| 314-3AA | X | 5 | 16 | 0.781 | 261 | 40 | 241 | 183 | 154 | 1200 | |
| 314-3AB | X | 5 | 16 | 0.781 | 261 | 38 | 248 | 181 | 152 | 1200 | |
| 314-3AC | X | 5 | 16 | 0.781 | 261 | 42 | 254 | 182 | 154 | 1200 | |
| 314-3AD | X | 5 | 16 | 0.781 | 261 | 41 | 254 | 185 | 154 | 1200 | |
| 314-3AD | X | 5 | 16 | 0.781 | 261 | 43 | 260 | 189 | 154 | 1200 | |
| 314-3AE | X | 5 | 17 | 0.781 | 277 | 38–44 | 264–271 | 191–196 | 157–160 | 1000–1150 | |
| 5% HYDRATED GUM | | | | | | | | | | | |
| 314-3AF | HG | 5 | 17 | 0.781 | 277 | 41 | 228 | 163 | 154 | 1100 | |
| 314-3AG | HG | 5 | 17 | 0.781 | 277 | 44 | 235 | 166 | 157 | 1180 | |
| 314-3AH | HG | 5 | 17 | 0.781 | 277 | 35 | 242 | 161 | 155 | 1400 | NONE-CORN STARCH ONLY & NO ADDITIVES |
| 314-3AI | HG | 5 | 17 | 0.781 | 277 | 53 | 247 | 155 | 154 | 1260 | |
| 314-3AJ | HG | 5 | 17 | 0.781 | 277 | 50 | 253 | 151 | 155 | 1400 | |
| 314-3AK | HG | 5 | 17 | 0.178 | 277 | 42 | 257 | 147 | 158 | 1250 | L-LOCUST BEAN GUM |
| 314-3AL | HG | 5 | 17 | 0.781 | 277 | 44 | 259 | 154 | 155 | 1400 | X-XANTHAN GUM HG-HYDRATED GUM COMBINATION |
| 315-4A1 | NONE | 0 | 15 | 0.432 | 245 | 42–46 | 155–160 | 84–86 | 155–158 | 1500 | COOLING WATER TEMP |
| 315-4A2 | NONE | 0 | 15 | 0.432 | 245 | 40–45 | 161–167 | 88–107 | 151–160 | 1200–1600 | 66–67F. |
| 315-A43 | NONE | 0 | 16 | 0.432 | 261 | 43–55 | 174–184 | 117–125 | 154–158 | 1100–1400 | |
| 315-4A4 | NONE | 0 | 16 | 0.432 | 261 | 37–48 | 190–192 | 126–127 | 152–158 | 1250–1400 | 9.7 LB/MIN WATER COOLING |

TABLE IV-continued

EXTRUSION RUN DATA FOR WENGER TX 80

| RUN # | AD-DITIVE | AD-DITIVE % AS-IS | FEED-ER RPM | WATER LB/MIN | FEED LB/HR | % LOAD | DEG F. @DIE | DEG F. @CONE | BARREL RPM | PSIG @DIE | COMMENTS |
|---|---|---|---|---|---|---|---|---|---|---|---|
| 315-4B | NONE | 0 | 16 | 0.432 | 261 | 48–51 | 195 | 126–127 | 154–159 | 1300–1400 | |
| | EXTRUDER PLUGGED | | | | | | | | | | |
| | NONE - USING ONLY CORN PRODUCTS 3401 UNMODIFIED FOOD GRADE STARCH | | | | | | | | | | |

What is claimed is:

1. A dry mix composition consisting essentially of the ingredients of a sauce, gravy, salad dressing, pudding mix, soup, dough conditioner or beverage and a heterogeneous mixture of physically modified starch particles wherein a majority of said starch particles are partially to fully gelatinized said heterogeneous mixture having a hydration capacity greater than about 5 and percent solubles less than about 2.

2. The composition of claim 1 wherein the hydration capacity is greater than about 7.

3. The composition of claim 2 wherein the percent solubles is less than about 1.5.

4. A dry mix composition consisting essentially of the ingredients of a sauce, gravy, salad dressing, pudding mix, soup, dough conditioner or beverage and an admixture of a heterogeneous mixture of physically modified starch particles wherein a majority of said starch particles are partially to fully gelatinized and a gum and/or a surfactant said heterogeneous mixture having a hydration capacity greater than about 5 and percent solubles less than about 2.

5. The composition of claim 4 wherein the gum is present in an amount from about 0.05% to about 20% by weight of starch.

6. The composition of claim 5 wherein the surfactant is present in an amount from about 2% to about 50% by weight of starch.

7. The composition of claim 4 wherein the gum is present in an amount from about 0.5% to about 10% by weight of starch.

8. The composition of claim 4 wherein the surfactant is present in an amount from about 2% to about 50% by weight of starch.

9. The composition of claim 8 wherein less than about 35% surfactant is present.

* * * * *